United States Patent
Zhu et al.

(10) Patent No.: US 7,374,105 B2
(45) Date of Patent: May 20, 2008

(54) RFID TAG WITH IMPROVED RANGE

(75) Inventors: Shengbo Zhu, San Jose, CA (US); Su Shiong Huang, Bellevue, WA (US)

(73) Assignee: Magnex Corporation, San Jose, CA (US)

( * ) Notice: Subject to any disclaimer, the term of this patent is extended or adjusted under 35 U.S.C. 154(b) by 236 days.

(21) Appl. No.: 11/262,089

(22) Filed: Oct. 29, 2005

(65) Prior Publication Data

US 2007/0095926 A1    May 3, 2007

(51) Int. Cl.
*G06K 19/06*    (2006.01)
(52) U.S. Cl. .................. 235/492; 235/439; 235/449; 235/493
(58) Field of Classification Search ............... 235/451, 235/439, 449, 492, 493; 361/737
See application file for complete search history.

(56) References Cited

U.S. PATENT DOCUMENTS 5,321,240 A * 6/1994 Takahira ................. 235/380
7,044,388 B2 * 5/2006 Kamiya et al. .......... 235/492

* cited by examiner

*Primary Examiner*—Seung H Lee

(57) ABSTRACT

An RFID tag having an rfid integrated circuit and an antenna is combined with a first passive antenna circuit to provide an extended operating range. The first passive antenna circuit has a first coil and a first capacitor to tune the passive antenna circuit to a resonant frequency the same as the operating frequency of the RFID tag. The first coil has a central opening larger than the size of the antenna. The passive antenna circuit is arranged with the antenna located in the central opening of the coil, preferably in a co-planar manner, to promote inductive interaction therebetween. A second passive antenna circuit essentially identical to the first, but having larger dimensions, is positioned with the coil of the second passive antenna circuit surrounding the first coil to extend the operating range even further.

15 Claims, 5 Drawing Sheets

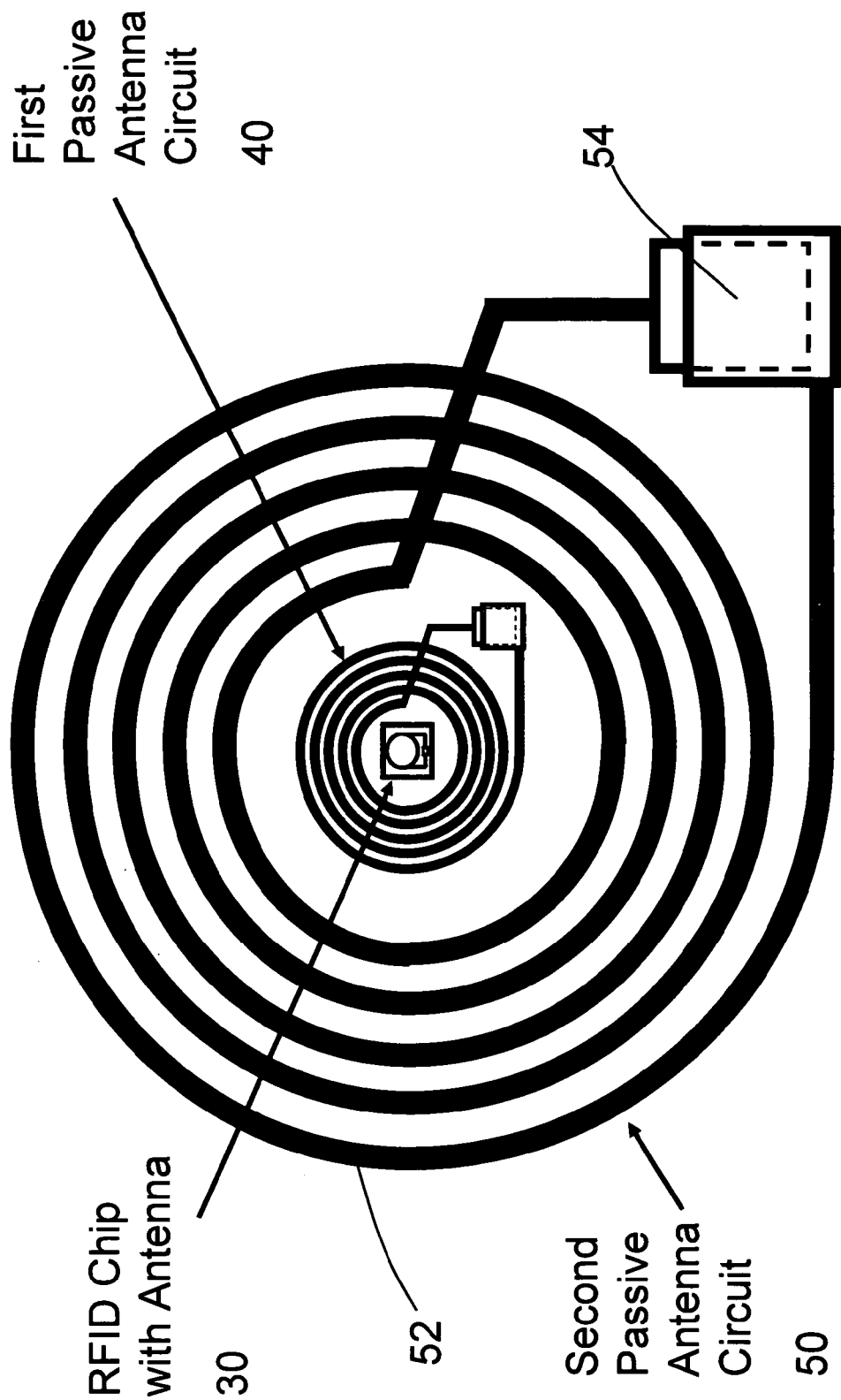

RFID TAG WITH IMPROVED RANGE

BACKGROUND OF THE INVENTION

This invention relates to the field of rfid (radio frequency identification) chip and antenna technology. More particularly, this invention relates to an rfid chip and antenna having an improved range of communication with an associated r.f. interrogation/reading device A typical rfid chip and antenna are usually both incorporated into an ID tag, such as that shown and described in U.S. Pat. No. 6,154,137 issued Nov. 28, 2000, the disclosure of which is hereby incorporated by reference. Generally, an ID tag has the antenna and the rfid chip mounted on or encapsulated in a thin substrate, such as a polyethylene terephthalate (PET) substrate as disclosed in U.S. Pat. No. 6,373,708 B1 issued Apr. 16, 2002, the disclosure of which is hereby incorporated by reference. The antenna is usually a small loop antenna or a dipole antenna, and must be ohmically connected to the rfid chip. The usual loop antenna is a multi-turn planar ohmic conductor formed in any one of several known ways. One such technique is silver paste printing on a suitable substrate, such as the PET substrate noted above. Another known technique for forming a loop antenna is copper deposition on a substrate as practiced by RCD Technology Corporation of Bethlehem, Pa. The size of the coil (coil diameter and thickness) and the number of turns is determined by the requirements of a particular application, including constraints on the physical size of the ID tag. The function of the antenna is to provide electromagnetic transfer of information between the rfid chip and outside interrogation/reader devices, such as a host CPU, a user reading station, or the like; as well as to enable inductive transfer of electrical power from an outside device into the rfid chip to furnish electrical power to the active circuit elements within the rfid chip.

Many types of commercially available rfid chips are known at present, each having the standard internal functional components commonly found in an rfid integrated circuit. Such standard components include an RF and analog section, a CPU, a ROM and an EEPROM (see 1999 IEEE International Solid-State Circuits Conference publication 0-7803-5129-0/99, FIG. 9.1.1: RFID transponder IC block diagram). The rfid chip receives electrical power via the antenna when interrogated by an outside device, and communicates with the outside device using standard protocols, such as the ISO 14443 protocol or the ISO15693 protocol. Prior to installation of an ID tag on an object, information identifying the object to be attached is written into the ROM (read-only memory) incorporated into the rfid chip. Once this information is written once into the ROM, it cannot be written over or otherwise altered by any interrogation device. The rfid chip can be interrogated by an outside interrogation/reader device and can only supply the information to the outside device—i.e., it cannot alter the information stored in the ROM.

ID tags of the type described above having an rfid chip and an antenna are very useful for object tracking and are currently used in a wide variety of such applications. Many more applications of this technology are theoretically possible, but practical implementations have been limited in the past by size and cost constraints. These constraints have been recently addressed by improved semiconductor batch processing techniques to the extent that very small rfid chips and antennae can now be produced at a cost substantially less than the cost of the individual objects to which they are intended to be attached. For example, Hitachi, LTD. of Tokyo, Japan introduced the mu series rfid chip and antenna in 2004, with a chip size of 0.4 mm×0.4 mm and a cost at least one-third less than the price of rfid chips then on the market. Other semiconductor manufacturers have followed suit with their own competitive offerings.

FIG. 1 is a top plan view of a prior art ID tag 10 having an rfid chip 12 and a separate discrete antenna 14, both of which elements are mounted on a substrate 15. The rfid chip 12 is an integrated circuit containing the usual circuitry required for a functional rfid device, and is a separately fabricated device. These integrated circuit devices are typically manufactured using batch processing techniques which are well known to those skilled in the art. In general, multiple copies of the basic device design are built up on a large semiconductor wafer, after which the individual chips are separated from each other and combined with other discrete components.

For the FIG. 1 ID tag 10, the other discrete component is the antenna 14, which enables the rfid chip 12 circuitry to communicate with an outside interrogation device and also enables the electromagnetic transfer of energy into the rfid chip 12 to power the electronic circuitry contained therein. Since the useful operating range of an rf antenna is a direct function of coil area, antenna 14 is ideally a multi-turn coil subtending a much larger area than rfid chip 12 in order to provide as large an effective operating range as possible. Antenna 14 is typically either a separately formed discrete coil which is then adhered to substrate 15, or a metallic layer deposited directly on substrate 15 during formation of the coil.

The ID tag 10 of FIG. 1 is typically constructed by first fabricating the rfid chip 12 and antenna 14 as separate components, mounting components 12 and 14 to substrate 15, and electrically connecting antenna 14 to rfid chip 12. For this purpose, rfid chip 12 is fabricated with two ohmic connection pads 16, 17 to which the free ends 18, 19 of antenna 14 are bonded.

While the process of constructing ID tag 10 appears simple and straightforward, in practice the process is actually quite difficult to perform with a high degree of repeatable accuracy. This difficulty is primarily due to the small dimensions of the connection pads on the rfid chip; the requirement that the free ends 18, 19 of antenna 14 be precisely positioned over pads 16, 17 just prior to the bonding step of the process; and the additional requirement that a precise mechanical and ohmic bond must be made between the antenna ends and the connection pads. It is estimated that the cost of producing an ID tag of the type shown in FIG. 1 is: rfid chip 12: ⅓rd; antenna 14: ⅓rd; assembly: ⅓rd. As the physical size of the rfid chip is reduced, these difficulties in assembling a properly functioning ID tag, and the assembly cost, increase accordingly.

FIG. 2 illustrates one recent approach made in the art to eliminate the difficulties in assembling an ID tag having separate rfid chip and antenna components. As seen in this FIG., an ID tag 20 is fabricated with an integrally formed rfid chip 22 and antenna 24 on a substrate 25. Because the antenna 24 is formed along with the rfid chip 22 during the chip fabrication process, an ohmic connection is automatically created between the rfid chip 22 and the free ends of antenna 24. This "coil-on-a-chip" approach eliminates the costly bonding step and the difficulties associated therewith.

While the "coil-on-a-chip" solution does eliminate the problems associated with bonding of discrete components in the ID tag assembly process, it introduces a severe limitation on the effective operating range of an ID tag fabricated according to this technique. Since the "coil-on-a-chip" ID tags are fabricated using integrated circuit batch processing techniques, the size of the antenna is extremely limited to the size of the dies produced. For example, the published operating range of one commercially available "coil-on-a-chip" ID tag is limited to a maximum distance of 3.0 mm. While this may be adequate for some specialized applications, such a small operating range is unsuitable for the majority of applications currently envisioned for ID tags.

One attempt to extend the operating range of a "coil-on-a-chip" ID tag is disclosed in U.S. Pat. No. 6,268,796 issued Jul. 31, 2001 for "Radio Frequency Identification Transponder Having Integrated Antenna", the disclosure of which is hereby incorporated by reference. According to the teachings of this reference, an antenna is formed on a chip which is mounted above or below the rfid chip. The antenna has a number of coil turns which together constitute a helical coil whose axis is parallel to the major body plane of the rfid chip. To increase the inductance of the antenna coil, and thus the operating range of the ID tag, a high magnetic permeability layer is formed on the antenna chip. While this configuration does increase the operating range of a "coil-on-a-chip" ID tag, it requires several additional processing steps, which increase the fabrication cost and potentially affect the yield, and only provides an antenna with a relatively small area.

Thus, current RFID tags, both those having a discrete integrated circuit chip and antenna and the "coil-on-a-chip" variety, still suffer from the severe disadvantage of a limited effective operating range with the associated interrogation/reader device.

SUMMARY OF THE INVENTION

The invention comprises a method and system for providing an RFID tag with an increased operating range over known ID tags of comparable dimensions.

From an apparatus aspect, the invention comprises the combination of an RFID tag, comprising an rfid integrated circuit and an antenna having an operating frequency, with a first passive antenna circuit comprising a first multi-turn coil and a first capacitor connected to the first coil. The passive antenna circuit has a resonant frequency substantially the same as the operating frequency of the RFID tag.

The first coil has an essentially helical configuration with a central opening larger than the size of the antenna, so that the passive antenna circuit and the RFID tag can be assembled together with the antenna located in the central opening and arranged for inductive interaction with the first coil. When assembled, the first coil is essentially co-planar with the antenna.

In an alternate embodiment, the invention further includes a second passive antenna circuit comprising a second multi-turn coil and a second capacitor, the second passive antenna circuit having a resonant frequency substantially the same as the resonant frequency of the first passive antenna circuit. The second multi-turn coil has an essentially helical configuration with a central opening larger than the outer diameter of the first coil so that the first and second passive antenna circuits can be assembled with the first coil located in the central opening of the second coil for mutual inductive interaction. When assembled, the first and second coils are essentially co-planar.

From a process aspect, the invention comprises a method of extending the operating range of an RFID tag having an rfid integrated circuit and an antenna, the method comprising the steps of:

(a) providing an RFID tag having an rfid integrated circuit and an antenna having an operating frequency;
(b) providing a passive antenna circuit having a first multi-turn coil and a first capacitor connected to the first coil, the passive antenna circuit having a resonant frequency substantially the same as the operating frequency; and
(c) combining the RFID tag and the passive antenna circuit for mutual inductive interaction between the first coil and the antenna.

The first coil has a central opening greater than the size of the antenna; and step (c) of combining preferably includes the step of positioning the first coil with the central opening surrounding the antenna. Step (c) of combining also preferably includes the step of arranging the antenna and the first coil essentially co-planar.

The method may further include the steps of:

(d) providing a second passive antenna circuit having a second multi-turn coil and a second capacitor connected to the second coil, the second passive antenna circuit having a resonant frequency substantially the same as the resonant frequency of the first passive circuit; and
(e) combining the first passive antenna circuit and the second passive antenna circuit for mutual inductive interaction between the first coil and the second coil.

The second coil has a central opening greater than the size of the first coil; and step (e) of combining preferably includes the step of positioning the second coil with the central opening surrounding the first coil. The step (e) of combining preferably includes the step of arranging the first coil and the second coil essentially co-planar.

The invention affords all of the advantages of a "coil-on-a-chip" ID tags and discrete component RFID tags, but provides a much greater operating range than known devices. This increased operating range is estimated to be a factor of five greater than known RFID tags.

For a fuller understanding of the nature and advantages of the invention, reference should be made to the ensuing detailed description taken in conjunction with the accompanying drawings.

BRIEF DESCRIPTION OF THE DRAWINGS

FIG. 5 is a top plan view illustrating an alternate embodiment of the invention having an additional passive antenna.

DETAILED DESCRIPTION OF THE PREFERRED EMBODIMENTS

Figure 1:
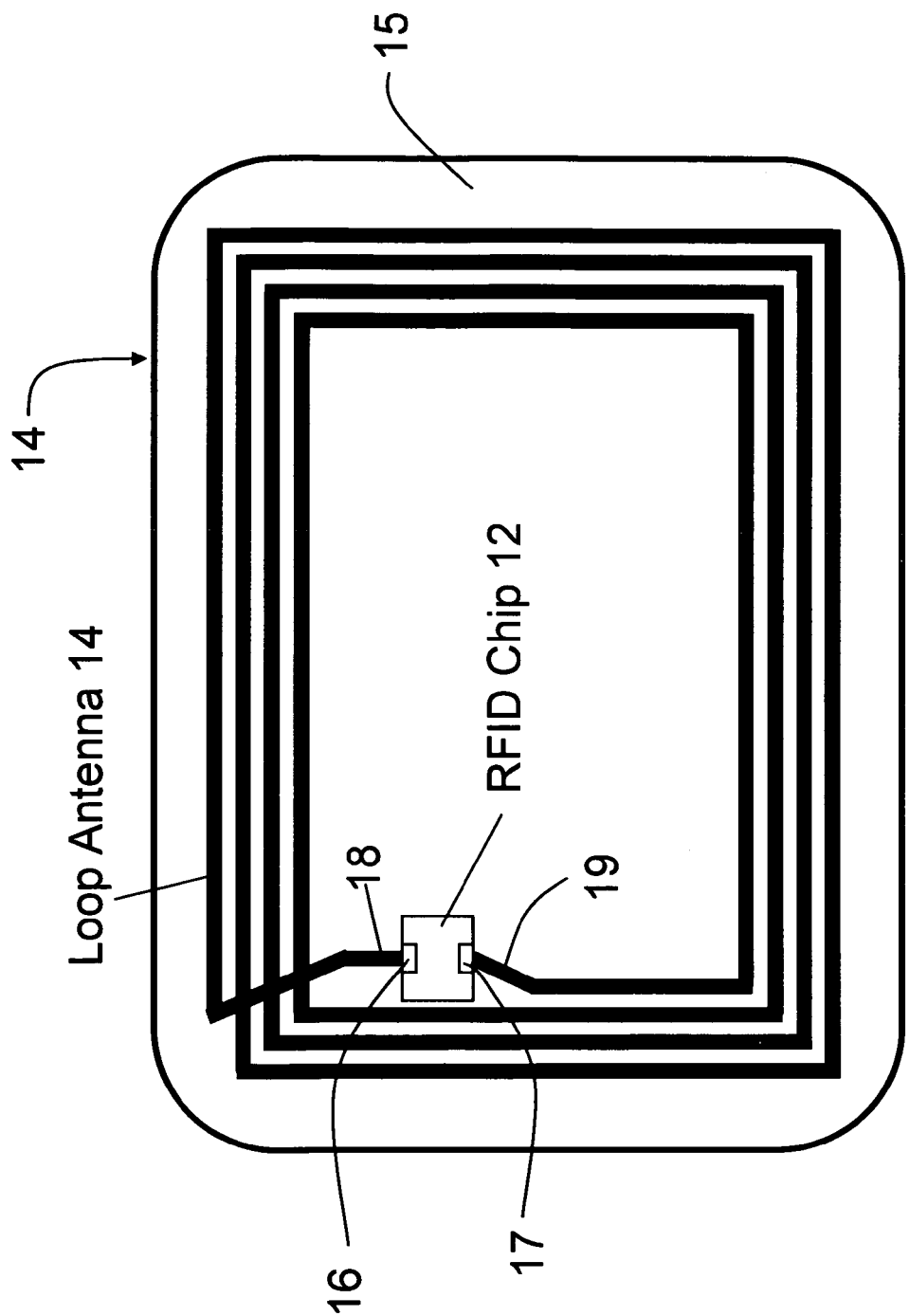
FIG. 1 is a plan view of a prior art ID tag having an rfid chip and a separate antenna.
Figure 2:
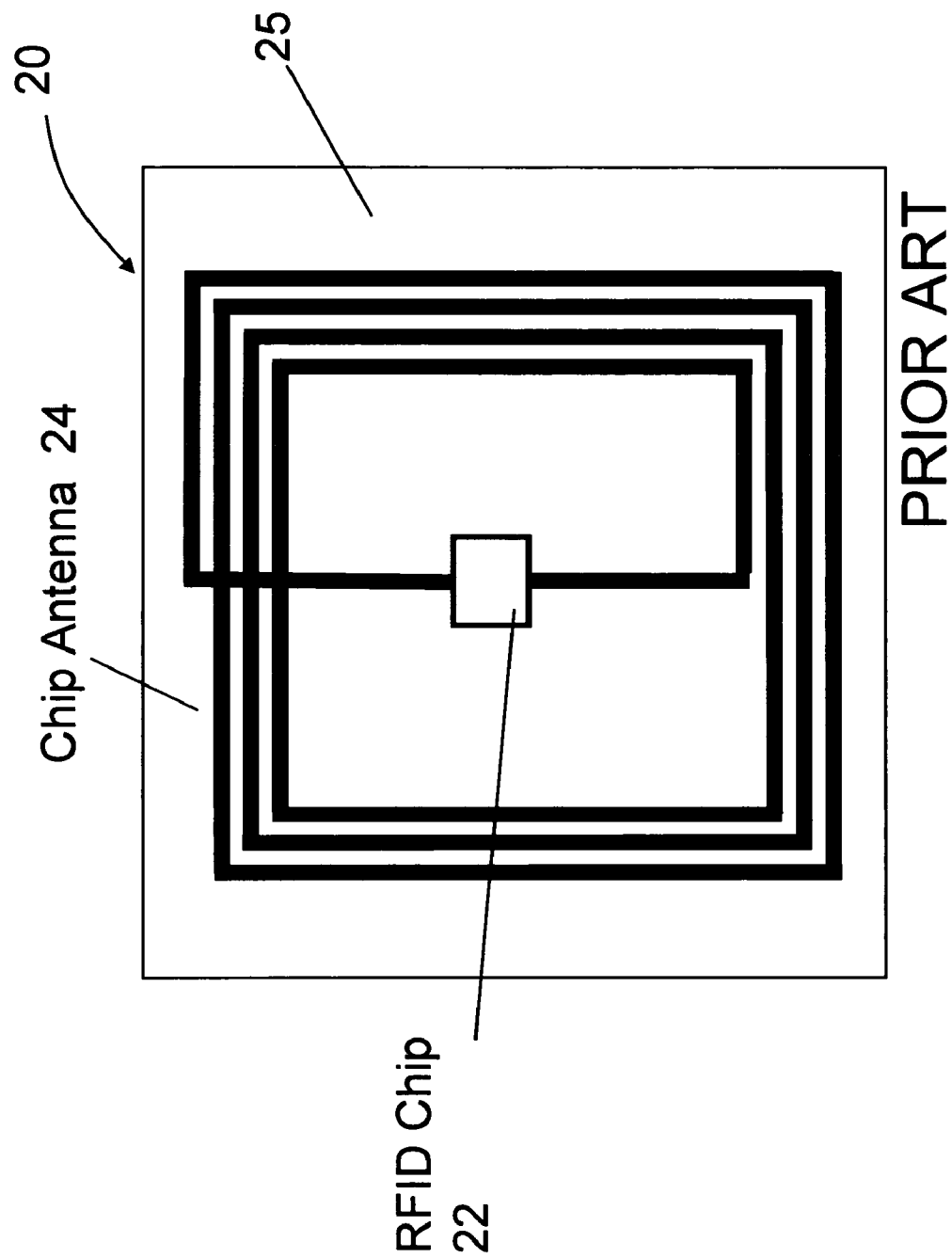
FIG. 2 is a plan view of a prior art ID tag having an rfid chip and an integrally formed antenna.
Figure 3:
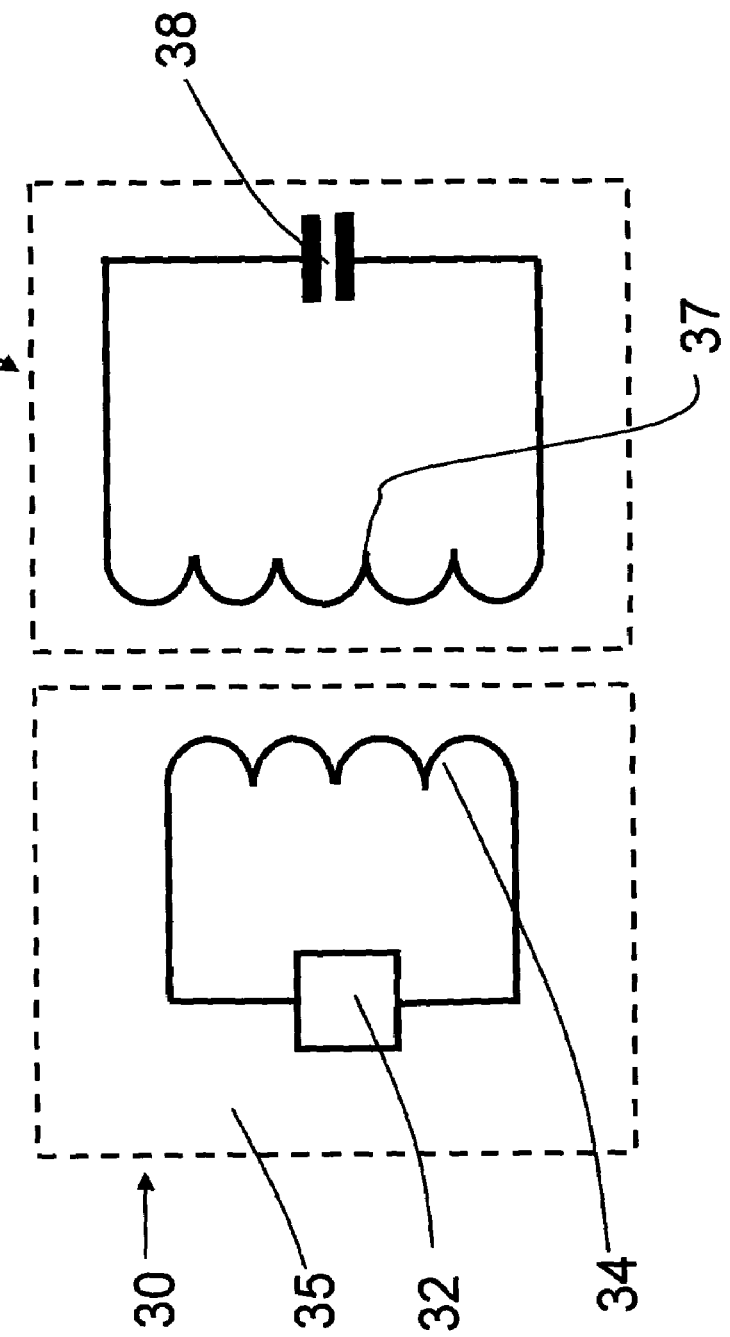
FIG. 3 is a schematic view of an ID tag having an rfid chip and a passive antenna according to the invention.

Turning now to the drawings, FIG. 3 is a schematic view illustrating the principle of the invention. As seen in this FIG., a "coil on a chip" RFID tag 30 has an rfid integrated circuit chip 32 and an integrally formed antenna 34 fabricated on an integrated circuit substrate 35. Positioned adjacent antenna 34 is a passive antenna circuit 36 having a coil 37 and a tuning capacitor 38. Coil 37 has a much greater area than chip antenna 34, and the two elements are arranged for inductive interaction with each other.

Tuning capacitor 38 enables the resonant frequency of passive antenna circuit 36 to be selected to match the resonant frequency of the circuit comprising rfid integrated circuit 32 and chip antenna 34 so that their inductive coupling is maximized.

When an interrogation signal at the operating frequency selected for RFID tag 30 is broadcast within the range of passive antenna circuit 36, the interrogation signal is sensed by passive antenna circuit 36, transferred to chip antenna 34, and into rfid integrated circuit 32. When integrated circuit 32 transmits a response to the interrogation signal, the response is initially broadcast by chip antenna 34, sensed by passive antenna circuit 36, and transferred to the remote interrogation system. Because the range of passive antenna circuit 36 is substantially greater than that of RFID tag 30, the addition of passive antenna circuit 36 extends the operating range of RFID tag 30 by a significant factor, on the order of five times the normal operating range.

Figure 4:
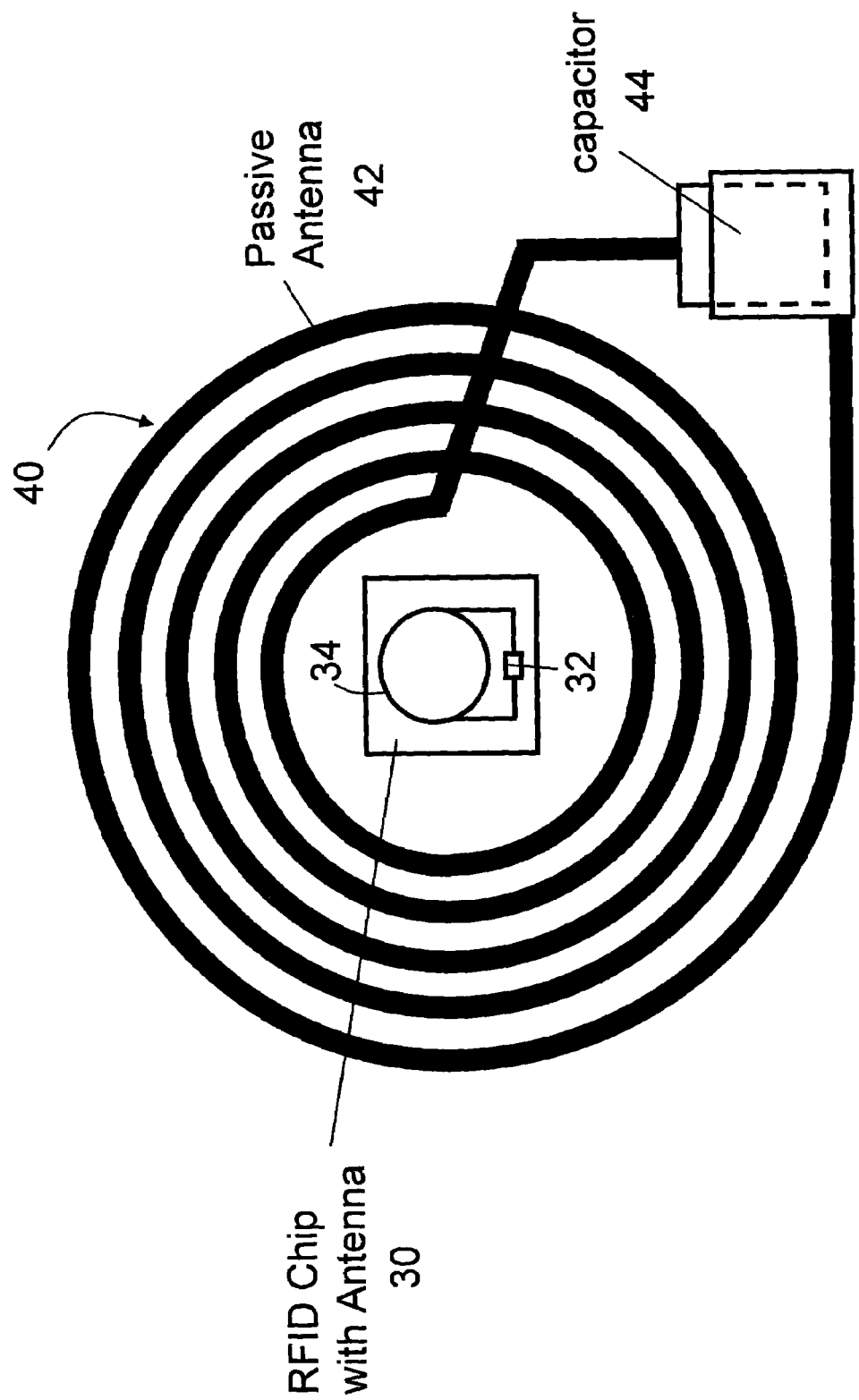
FIG. 4 is a top plan view illustrating a first embodiment of the invention having a single passive antenna.

FIG. 4 illustrates a first embodiment of the invention having a single passive antenna circuit 40. As seen in this FIG., passive antenna circuit 40 comprises a multi-turn coil 42 coupled at each end to different plates of a tuning capacitor 44. Coil 42 has an open central portion sufficiently large to accommodate an RFID tag, such as tag 30. Coil 42 may be formed in any desired fashion, such as the silver paste printing or copper deposition techniques noted above. Capacitor 44 may be a discrete component element or an element formed using semiconductor fabrication techniques (deposition, masking, etching, etc.). The value of capacitor 44 must be carefully chosen so that the resonant frequency of passive antenna circuit 40 matches the operating frequency of RFID tag 30. RFID tag 30, antenna 42 and capacitor 44 are preferably mounted on some type of common mounting surface (not shown), which is usually a mounting substrate fabricated from any suitable material. For example, if the FIG. 4 embodiment is designed for use with a garment, the mounting surface is typically the garment paper tag. Similarly, if the FIG. 4 embodiment is designed for use with a small packaged product, the mounting surface is typically a surface of the product package itself.

In operation, when an interrogation signal at the operating frequency selected for RFID tag 30 is broadcast within the range of passive antenna circuit 40, the interrogation signal is sensed by passive antenna circuit 40, transferred to chip antenna 34, and into rfid integrated circuit 32. When integrated circuit 32 transmits a response to the interrogation signal, the response is initially broadcast by chip antenna 34, sensed by passive antenna circuit 36, and transferred to the remote interrogation system. Because the range of passive antenna circuit 40 is substantially greater than that of RFID tag 30, the addition of passive antenna circuit 40 extends the operating range of RFID tag 30 by a significant factor, on the order of five times the normal operating range.

FIG. 5 illustrates a second embodiment of the invention having two passive antenna circuits. As seen in this FIG., first passive antenna circuit 40 is arranged in an attitude surrounding RFID tag 30 in the same manner depicted in FIG. 4. A second larger passive antenna circuit 50 has a relatively large inductive coil 52 ohmically connected at each end to the plates of a second capacitor 54. The central opening in coil 52 is sufficiently large to accommodate coil 42 of first passive antenna circuit 40. Passive antenna circuit 50 is tuned to the same frequency as first passive antenna circuit 40 by selecting a capacitor 54 of proper value. The structure of antenna 52 and capacitor 54 is essentially the same as coil 42 and capacitor 44, with the exception that the dimensions of coil 52 are substantially larger than those of coil 42.

Operation of the embodiment of FIG. 5 is similar to that already described for the embodiment of FIG. 4. When an interrogation signal at the operating frequency selected for RFID tag 30 is broadcast within the range of second passive antenna circuit 50, the interrogation signal is sensed by second passive antenna circuit 50, transferred to first passive antenna circuit 40, transferred to chip antenna 34, and into rfid integrated circuit 32. When integrated circuit 32 transmits a response to the interrogation signal, the response is initially broadcast by chip antenna 34, sensed by passive antenna circuit 40, transferred to second passive antenna circuit 50, and transferred to the remote interrogation system. Because the range of second passive antenna circuit 50 is substantially greater than that of first passive antenna circuit 40 and RFID tag 30, the addition of second passive antenna circuit 50 extends the operating range of the FIG. 4 embodiment even further.

The number of turns, the width of the individual coil line segments, and the spacing between coil turns of passive coils 42, 52 are all a matter of design choice. In general, the coil 42, 52 dimensions should be chosen in such a manner that the coil area is substantially larger than the element it encompasses in order to provide sufficient physical space for the encompassed element and a substantially greater inductance than the inductance of chip coil 34. However, the outer diameter of the passive coil should be sized appropriately to the size of the object on which the tag will be mounted. Thus, for example, if the tag is to be used to track a small jewelry piece, the outer diameter of the passive coil should be smaller than the size of the jewelry piece.

It should be noted that precisely concentric placement of the passive antenna circuits 40, 50 with respect to RFID tag 30 is not necessary. It is sufficient that the passive antenna coils 42, 52 be approximately centered with respect to the chip coil 34 and to each other to promote substantial electromagnetic interaction among the inductive coils. Consequently, assembly of an RFID tag and one or two passive antenna circuits need not be a precision alignment process, thereby reducing the cost of assembly. In addition, since the passive antenna circuits can be fabricated at very low cost, the addition of one or more passive antenna circuits to an RFID tag adds no substantial cost to the product, and expands greatly the operating range of the RFID tag.

ID tags fabricated according to the teachings of the invention enjoy the advantages afforded by "coil-on-a-chip" ID tags-principally, the elimination of the bonding step involving the antenna coil and the rfid chip, and the cost benefits of large volume batch processing-while offering an increased operating range, estimated to be a factor of five greater than known "coil-on-a-chip" ID tags when only a single passive antenna circuit is used.

While the invention has been described with reference to a particular preferred implementation, various modifications, alternate constructions and equivalents may be employed without departing from the spirit of the invention. For example, while the invention has been described with reference to a "coil-on-a-chip" RFID tag, use with an RFID tag having a discrete rfid integrated circuit and antenna is fully contemplated. Also, while passive coils 44, 54 have been shown and described as single layer coils, coils having two or more layers each of multiple turns may be employed, as desired. In addition, while the invention has been described and shown with reference to closed loop coils, a dipole antenna is also contemplated. Therefore, the above should not be construed as limiting the invention, which is defined by the appended claims.

What is claimed is:

1. In combination with an RFID tag having an rfid integrated circuit and an antenna having an operating frequency, a first passive antenna circuit comprising a first multi-turn coil and a first capacitor connected to said first coil, said passive antenna circuit having a resonant frequency substantially the same as said operating frequency, said first coil having a central opening substantially surrounding said RFID tag and arranged for inductive interaction with said antenna, said passive antenna circuit being devoid of ohmic contact with said antenna.

2. The invention of claim 1 wherein said first coil is essentially co-planar with said antenna.

3. The invention of claim 1 wherein said first coil has an essentially helical configuration.

4. The invention of claim 1 further including a second passive antenna circuit comprising a second multi-turn coil and a second capacitor, said second passive antenna circuit having a resonant frequency substantially the same as the resonant frequency of said first passive antenna circuit, said second multi-turn coil having a central opening substantially surrounding said first coil and arranged for inductive interaction with said first coil.

5. The invention of claim 4 wherein said second coil is essentially co-planar with said first coil.

6. The invention of claim 4 wherein said second coil has an essentially helical configuration.

7. A method of extending the operating range of an RFID tag having an rfid integrated circuit and an antenna, said method comprising the steps of:
  (a) providing an RFID tag having an rfid integrated circuit and an antenna having an operating frequency;
  (b) providing a passive antenna circuit having a first multi-turn coil and a first capacitor connected to said first coil, the passive antenna circuit having a resonant frequency substantially the same as the operating frequency; and
  (c) combining the RFID tag and the passive antenna circuit for mutual inductive interaction between the first coil and the antenna.

8. The method of claim 7 wherein the first coil has a central opening greater than the size of the antenna; and wherein said step (c) of combining includes the step of positioning the first coil with the central opening surrounding the antenna.

9. The method of claim 7 wherein said step (c) of combining includes the step of arranging the antenna and the first coil essentially co-planar.

10. The method of claim 7 further including the steps of;
  (d) providing a second passive antenna circuit having a second multi-turn coil and a second capacitor connected to the second coil, the second passive antenna circuit having a resonant frequency substantially the same as the resonant frequency of the first passive circuit; and
  (e) combining the first passive antenna circuit and the second passive antenna circuit for mutual inductive interaction between the first coil and the second coil.

11. The method of claim 10 wherein the second coil has a central opening greater than the size of the first coil; and wherein said step (e) of combining includes the step of positioning the second coil with the central opening surrounding the first coil.

12. The method of claim 10 wherein said step (e) of combining includes the step of arranging the first coil and the second coil essentially co-planar.

13. In combination with an RFID tag having an rfid integrated circuit and an antenna having an operating frequency, a first passive antenna circuit comprising a first multi-turn coil and a first capacitor connected to said first coil, said passive antenna circuit having a resonant frequency substantially the same as said operating frequency, said first coil having a central opening substantially surrounding said RFID tag and arranged for inductive interaction with said antenna; and a second passive antenna circuit comprising a second multi-turn coil and a second capacitor, said second passive antenna circuit having a resonant frequency substantially the same as the resonant frequency of said first passive antenna circuit, said second multi-turn coil having a central opening substantially surrounding said first coil and arranged for inductive interaction with said first coil.

14. The invention of claim 13 wherein said second coil is essentially co-planar with said first coil.

15. The invention of claim 13 wherein said second coil has an essentially helical configuration.

* * * * *